United States Patent
Thornton et al.

(10) Patent No.: US 10,400,607 B2
(45) Date of Patent: Sep. 3, 2019

(54) LARGE-FOOTPRINT TURBINE COOLING HOLE

(71) Applicant: United Technologies Corporation, Hartford, CT (US)

(72) Inventors: Lane Thornton, Ellington, CT (US); Scott D. Lewis, Vernon, CT (US); Matthew A. Devore, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 1149 days.

(21) Appl. No.: 14/627,587

(22) Filed: Feb. 20, 2015

(65) Prior Publication Data
US 2016/0186576 A1    Jun. 30, 2016

Related U.S. Application Data

(60) Provisional application No. 62/097,702, filed on Dec. 30, 2014.

(51) Int. Cl.
| | | |
|---|---|---|
| *F01D 5/08* | (2006.01) | |
| *F01D 5/18* | (2006.01) | |
| *F01D 9/04* | (2006.01) | |
| *F01D 25/12* | (2006.01) | |

(52) U.S. Cl.
CPC ............ *F01D 5/186* (2013.01); *F01D 9/041* (2013.01); *F01D 25/12* (2013.01); *F05D 2220/30* (2013.01); *F05D 2230/12* (2013.01); *F05D 2230/13* (2013.01); *F05D 2260/202* (2013.01); *Y02T 50/673* (2013.01); *Y02T 50/676* (2013.01)

(58) Field of Classification Search
None
See application file for complete search history.

(56) References Cited

U.S. PATENT DOCUMENTS

| | | | |
|---|---|---|---|
| 4,653,983 A | | 3/1987 | Vehr |
| 4,672,727 A | * | 6/1987 | Field ...................... B23P 15/02 |
| | | | 29/527.2 |
| 5,688,104 A | * | 11/1997 | Beabout ................. F01D 5/187 |
| | | | 415/115 |
| 6,183,199 B1 | | 2/2001 | Beeck et al. |
| 7,328,580 B2 | | 2/2008 | Lee et al. |

(Continued)

FOREIGN PATENT DOCUMENTS

EP    1898051 A2    3/2008

OTHER PUBLICATIONS

European Search Report for European Application No. 15201050.0 dated May 25, 2016.

(Continued)

*Primary Examiner* — Kayla Mccaffrey
(74) *Attorney, Agent, or Firm* — Carlson, Gaskey & Olds, P.C.

(57) ABSTRACT

A cooling hole for a component includes a meter section and a diffuser section. The diffuser section has a footprint region defined by five sides, a first side of the five sides extending along substantially an entire height of the diffuser section and second and third sides of the five sides meeting in an obtuse angle opposite the first side. A component having the cooling hole and a method of forming the cooling hole are also disclosed.

26 Claims, 4 Drawing Sheets

(56) References Cited

U.S. PATENT DOCUMENTS

| | | |
|---|---|---|
| 7,997,866 B2 * | 8/2011 | Naik ................. F01D 5/186 416/97 R |
| 8,057,180 B1 | 11/2011 | Liang |
| 8,057,181 B1 | 11/2011 | Liang |
| 8,079,810 B2 | 12/2011 | Liang |
| 8,168,912 B1 | 5/2012 | Liang |
| 8,328,517 B2 | 12/2012 | Liang |
| 8,683,814 B2 | 4/2014 | Xu |
| 8,689,568 B2 | 4/2014 | Kohli et al. |
| 8,707,713 B2 | 4/2014 | Levasseur et al. |
| 8,733,111 B2 | 5/2014 | Gleiner et al. |
| 8,763,402 B2 | 7/2014 | Xu et al. |
| 2013/0206739 A1 | 8/2013 | Reed et al. |
| 2013/0209233 A1 | 8/2013 | Xu et al. |
| 2014/0219815 A1 | 8/2014 | Kohli et al. |

OTHER PUBLICATIONS

Extended European Search Report for European Application No. 16197540.4 dated Feb. 14, 2017.
European Office Action for European Application No. 16197540.4 dated Jun. 28, 2018.

* cited by examiner

LARGE-FOOTPRINT TURBINE COOLING HOLE

CROSS-REFERENCE TO RELATED APPLICATIONS

This application claims priority to U.S. Provisional Application No. 62/097,702 filed on Dec. 30, 2014.

TECHNICAL FIELD

This application is related to cooling hole geometry for film cooling turbine blades.

BACKGROUND

Gas turbine engines typically include a plurality of sections which are mounted in series. Typically a fan delivers air to a compressor. Air is compressed in the compressor and delivered downstream to be mixed with fuel and combusted in a combustor section. Products of combustion move downstream over turbine rotors. The turbine rotors include a plurality of blades which rotate with the rotors, and are driven by the products of combustion. The turbine rotors drive components within the gas turbine engine, including the fan and compressor.

Blades such as those used in turbines or other sections of the gas turbine engine can become hot during operation of the engine. In one example cooling technique known as "film cooling," cooling air is passed through internal passages of the turbine blade, through holes in the surface of the turbine blade, and along an outer face of the turbine blade. The volume of air used as cooling air reduces air available for combustion, and effects engine efficiency.

SUMMARY

A cooling hole for a component according to an example of the present disclosure includes a meter section and a diffuser section. The diffuser section has a footprint region defined by five sides, a first side of the five sides being a longest side, and second and third sides of the five sides meeting in an obtuse angle opposite the first side.

In a further embodiment of any of the foregoing embodiments, fourth and fifth sides of the five sides connect the first side to the second side and the first side to the third side, respectively, and the fourth and fifth sides are substantially parallel to one another.

In a further embodiment of any of the foregoing embodiments, a ratio of a width of the footprint region to a diameter of the meter section is between approximately 2 and 10.

In a further embodiment of any of the foregoing embodiments, a ratio of a height of the diffuser section to the diameter of the meter section is between approximately 4 and 15.

In a further embodiment of any of the foregoing embodiments, the obtuse angle opens towards the interior of the diffuser section.

In a further embodiment of any of the foregoing embodiments, a geometry of the footprint region is defined by five axes each corresponding to one of the five sides.

In a further embodiment of any of the foregoing embodiments, cooling air flows across the footprint region.

A turbine component according to an example of the present disclosure includes a component surface and a plurality of cooling holes. At least one of the cooling holes includes a meter section and a diffuser section. The diffuser section has a footprint region defined by five sides, a first side of the five sides being a longest side, and second and third sides of the five sides meeting in an obtuse angle opposite the first side.

In a further embodiment of any of the foregoing embodiments, the turbine component is an airfoil.

In a further embodiment of any of the foregoing embodiments, the at least one cooling hole of the plurality of cooling holes is arranged along a cooling hole axis, and the cooling hole axis is oriented between 40°-80° from the longitudinal axis in a radial direction.

In a further embodiment of any of the foregoing embodiments, cooling air flows across the footprint region.

In a further embodiment of any of the foregoing embodiments, a ratio of a width of the footprint region to a diameter of the meter section is between approximately 2 and 10.

In a further embodiment of any of the foregoing embodiments, the plurality of cooling holes are arranged in an array along the component surface.

In a further embodiment of any of the foregoing embodiments, the plurality of cooling holes are arranged with a pitch between one another, and a ratio of the distance to a width of the footprint region is between approximately 5 and 20.

A cooling hole for a component according to an example of the present disclosure includes a meter section and a diffuser section. The diffuser section has a footprint region defined by at least five sides, a first side of the at least five sides being a longest side, and second and third sides of the at least five sides meeting in an obtuse angle opposite the first side.

In a further embodiment of any of the foregoing embodiments, fourth and fifth sides of the at least five sides connect the first side to the second side and the first side to the third side, respectively, and the fourth and fifth sides are substantially parallel to one another.

In a further embodiment of any of the foregoing embodiments, a ratio of a width of the footprint region to a diameter of the meter section is between approximately 2 and 10.

In a further embodiment of any of the foregoing embodiments, a ratio of a height of the diffuser section to the diameter of the meter section is between approximately 4 and 15.

In a further embodiment of any of the foregoing embodiments, the obtuse angle opens towards the interior of the diffuser section.

In a further embodiment of any of the foregoing embodiments, a geometry of the footprint region is defined by at least five axes each corresponding to one of the at least five sides.

In a further embodiment of any of the foregoing embodiments, cooling air flows across the footprint region.

A method for forming a cooled component according to an example of the present disclosure includes providing a component and forming in the component a plurality of cooling holes, each of the plurality of cooling holes each comprising a meter section and a diffuser section. The diffuser section has a footprint region defined by five sides, a first side of the five sides being a longest side, and second and third sides of the five sides meeting in an obtuse angle opposite the first side.

In a further embodiment of any of the foregoing embodiments, the forming step is accomplished by a milling process.

In a further embodiment of any of the foregoing embodiments, the milling process is high-speed electrical discharge machining (EDM).

In a further embodiment of any of the foregoing embodiments, the high-speed electrical discharge machining (EDM) includes bringing an electrode adjacent the component to remove material.

In a further embodiment of any of the foregoing embodiments, the forming is accomplished by a cutting process.

In a further embodiment of any of the foregoing embodiments, the cutting process is laser hole drilling.

In a further embodiment of any of the foregoing embodiments, wherein the cutting process is waterjet drilling.

DETAILED DESCRIPTION

Figure 1:
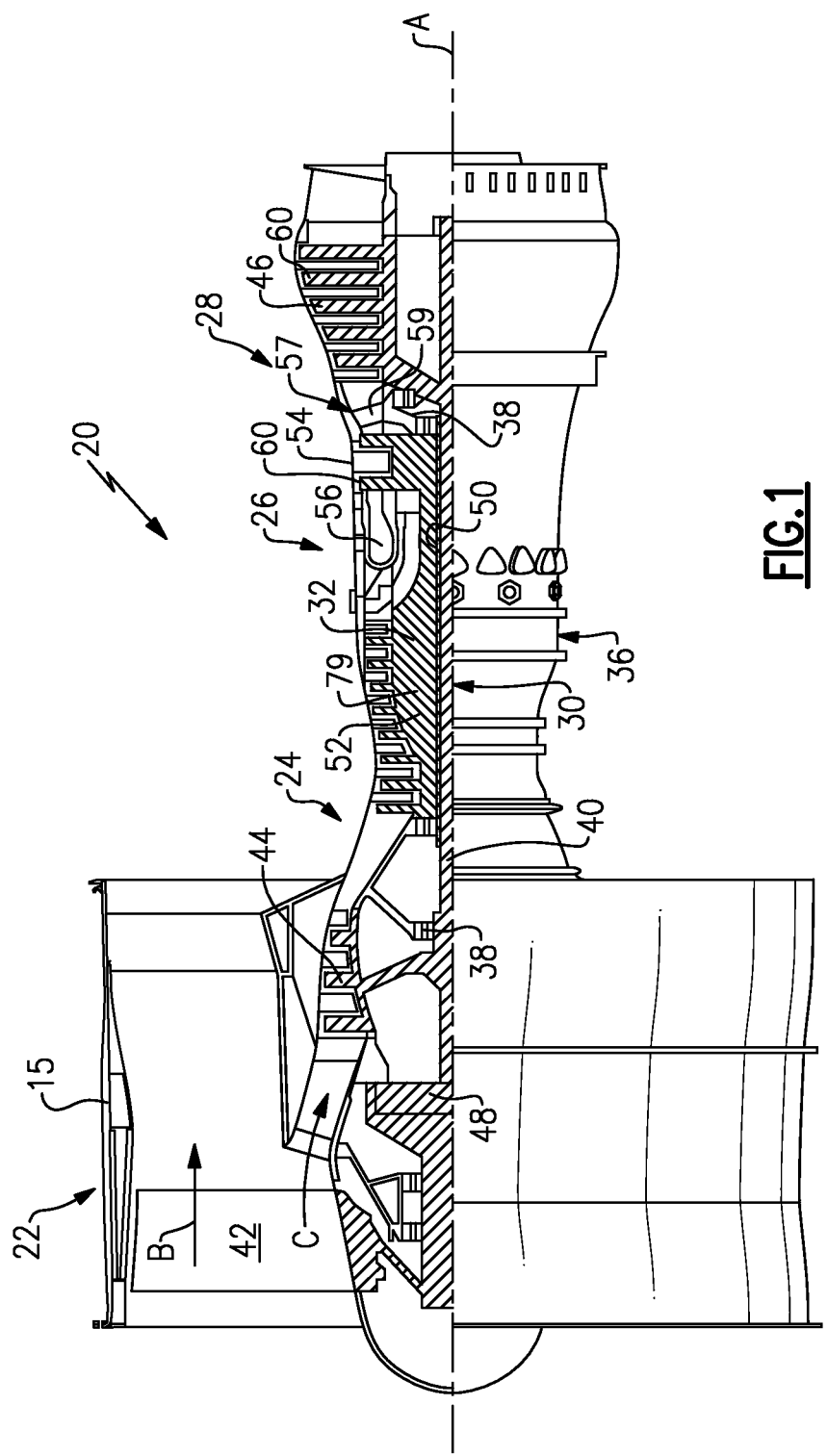
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7\ ^\circ R)]^{\wedge}0.5$. The "Low corrected fan tip speed" as disclosed herein according to one non-limiting embodiment is less than about 1150 ft/second (350.5 meters/second).

Figure 2A:
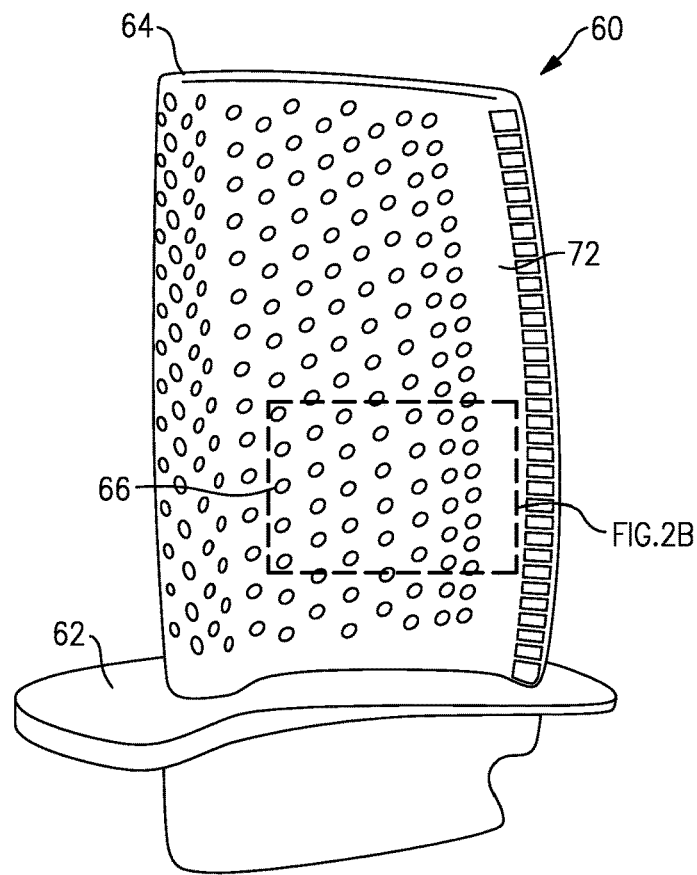
FIG. 2A schematically shows an example prior art turbine blade.
Figure 2B:
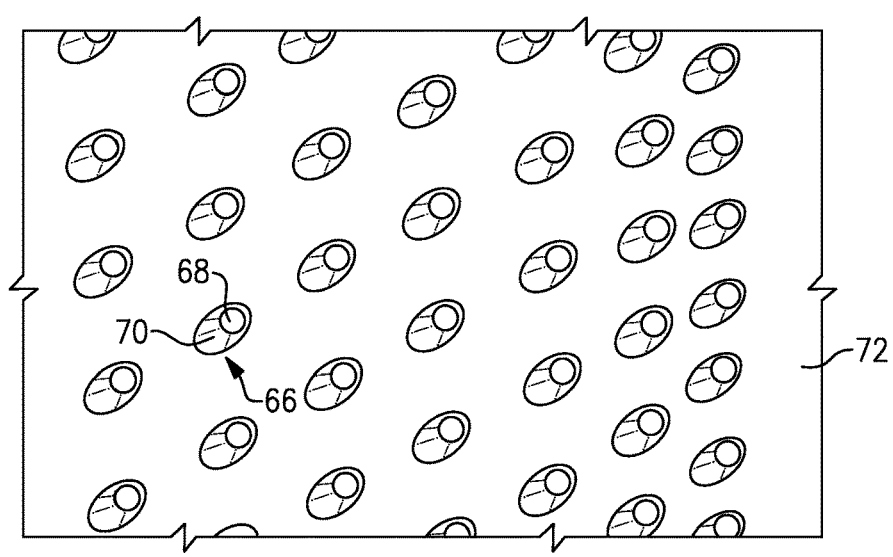
FIG. 2B schematically shows a close-up view of the prior art turbine blade of FIG. 2A.

FIG. 2A shows a prior art turbine blade 60. The turbine blade 60 may be in the low pressure turbine 46 or the high pressure turbine 54. A platform 62 and blade root form a base for an airfoil 64. The airfoil 64 includes a plurality of film cooling holes 66. As is shown in FIG. 2B, the film cooling holes 66 have a meter section 68, and a diffuser section 70. Cooling air from the low- or high-pressure compressor 44, 52, for example, passes through passages (not shown) on the interior of the turbine blade 60, through the meter section 68, across the diffuser section 70, and along a surface 72 of the turbine blade 60. The diffuser section 70 of the cooling holes 66 defines an oval-shaped opening in the surface 72 of the turbine blade 60.

Figure 3:
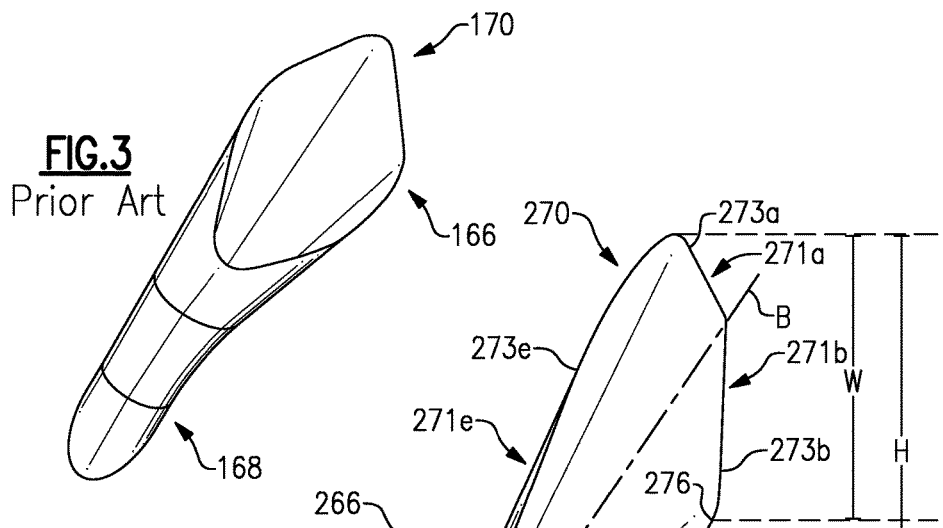
FIG. 3 schematically shows a prior art cooling hole.

FIG. 3 schematically shows a prior art traditional radially-shaped cooling hole 166. The traditional radially-shaped cooling hole 166 has a meter section 168 and a diffuser section 170 which defines a generally diamond-shaped opening in a surface of a turbine blade.

Figure 4:
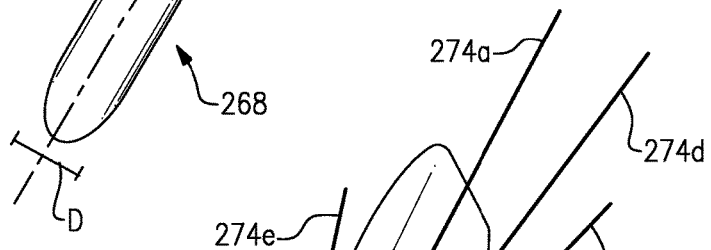
FIG. 4 schematically shows the disclosed large-footprint cooling hole.
Figure 5:
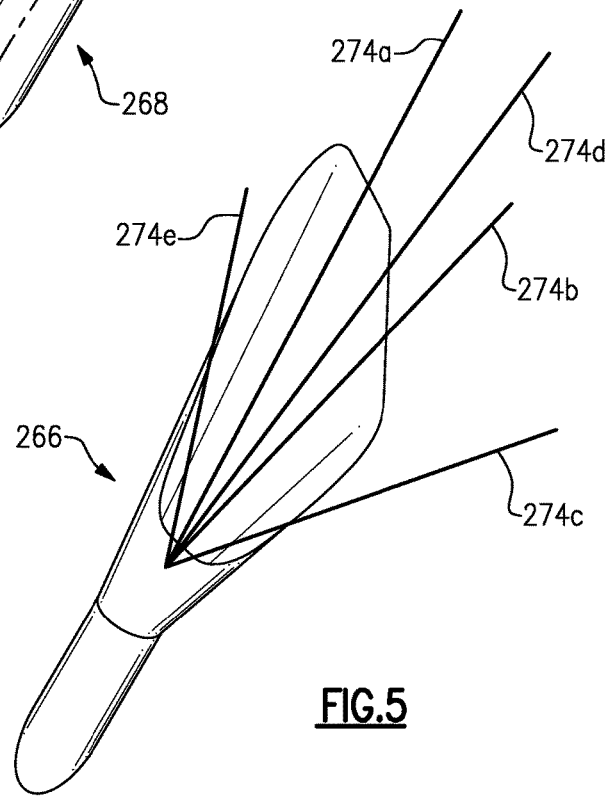
FIG. 5 schematically shows geometry of the large-footprint cooling hole of FIG. 4.
Figure 6:
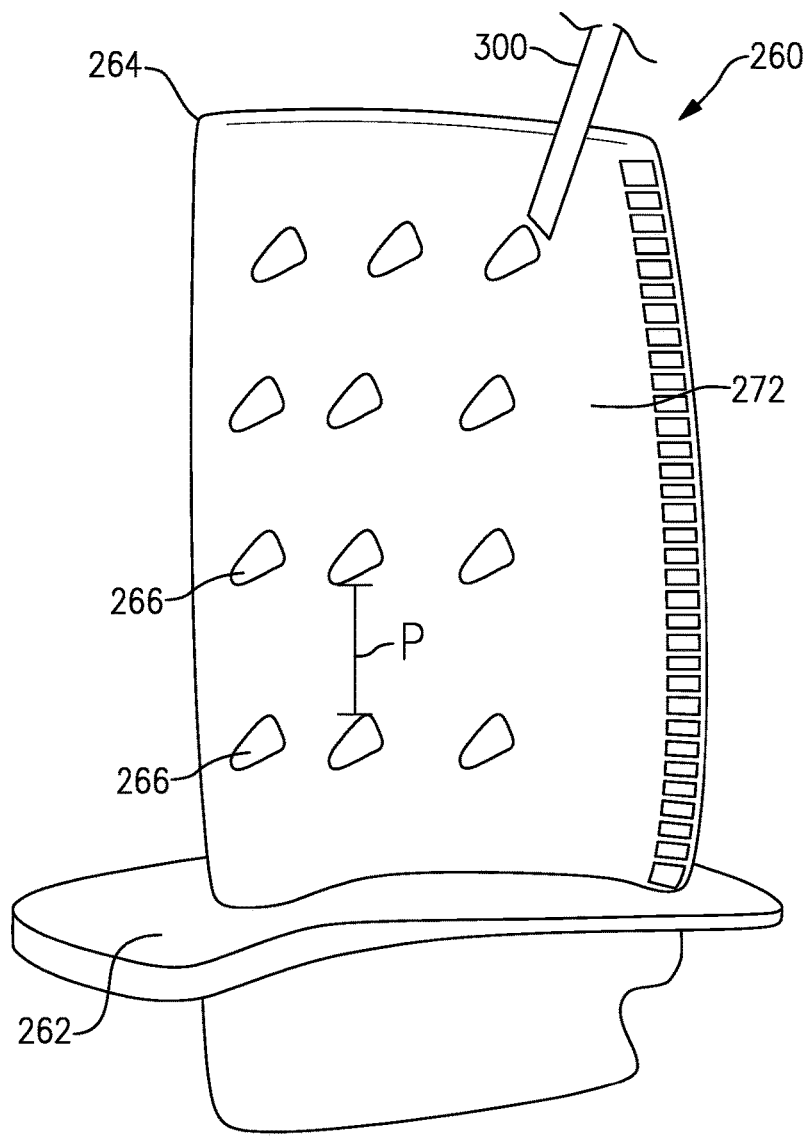
FIG. 6 schematically shows large-footprint cooling holes arranged on a turbine blade.

An example embodiment of this disclosure is shown in FIGS. 4-6. Referring to FIG. 4, a large-footprint cooling hole 266 includes a meter section 268 and a diffuser section 270. The diffuser section 270 includes five areas 271a-e which are confined by five sides 273a-e, respectively and are each defined along one of five axes 274a-e (FIG. 5), respectively. The five sides 273a-e define an opening in an exterior surface 272 of a turbine blade 260 (FIG. 6).

The turbine blade 260 can include a platform 262 and an airfoil 264 similar to the turbine blade 60 of FIG. 2A. It should be appreciated that a turbine blade is disclosed by way of example and that it is within the contemplation of this disclosure that the cooling hole 266 can be in another kind of blade or other turbine component, such as a static vane.

The large-footprint cooling hole 266 is oriented along an axis B (FIG. 4). In one example, the axis B is oriented from between 40°-80° in a radial direction from the gas turbine engine 20 centerline, or longitudinal axis A. That is, the turbine blades 260 are rotatable about the longitudinal axis A. In a particular example, the axis B is oriented 60° from the longitudinal axis A. The axis B is the axis along which cooling air flows through the cooling hole 266, whereas the longitudinal axis A is the axis along which the turbine 46, 54 rotates (and also represents the gas path of the gas turbine engine 20).

The diffuser section 270 includes a single lobe that extends away from the metering section 268 and is confined by the five sides 273a-e. The lobe is asymmetrical about the axis B. Each side 273a-e has a different length and the longest side is 273e. The sides 273a, 273d adjacent the longest side 273e are substantially parallel to one another. The remaining two sides 273b, 273c which are adjacent to sides 273a, 273d, respectively, meet at an obtuse angle 276 opposite the longest side 273e, the obtuse angle 276 opening towards the interior of the diffuser section 270.

In another example, the diffuser section 270 may be confined by more than five sides.

Referring to FIG. 5, each of the five sections 271a-e and five sides 273a-e corresponds to one of the five axes 274a-e, respectively. In contrast, the shape of a traditional radially-shaped cooling hole 166 is defined by angles of between one and three axes (not shown) relative to one another. While five axes are disclosed, a greater or lower number may also be utilized.

Referring again to FIG. 4, a width W is defined as the width of a footprint region 275 of the large-footprint cooling hole 266 in the diffuser section 270. The footprint region 275 is the surface area over which cooling air flows out of the large-footprint cooling hole 266 and along the surface 272 of the turbine blade 260. In the example disclosed in FIG. 4, the width W is defined as the distance between the meeting point of sides 273a and 273e and the meeting point of sides 273b and 273c (the obtuse angle 276). A diameter D is defined as a diameter of a metering section 268. A height H (FIG. 4) of the diffuser section 270 is defined as the longest distance across the opening. In the example of FIG. 4, the height H corresponds to the distance between the meeting point of sides 273d and 273c and of sides 273e and 273a.

In one example, a ratio of the width W to the diameter D (W/D) is between about 2.0 and 10.0. In another example, the ratio of the height H to the diameter D (H/D) is between about 4.0 and 15.0.

The large-footprint cooling hole 266 cools the turbine blade surface 272 more effectively than the prior art cooling hole 66 or the prior art traditional radially-shaped cooling hole 166 at high and low Mach numbers and high and low blowing ratios. The blowing ratio is a measure of the amount of cooling air relative to the airflow through the turbine 46, 54. The Mach number is a measure of the local speed of airflow through the turbine 46, 54 with respect to a surface of the airfoil 264 (FIG. 6).

This is because the diffuser section 270 and footprint 275 is larger and more effectively spreads cooling air along the surface 272 using larger diffusion angles (the angles between air exiting the cooling hole 266 and air passing through the turbine 46 or 54) and increased area ratios (the ratio of the exit area of the meter section 268 to the exit area of the diffuser 270) as compared to the prior art cooling holes 66, 166.

Therefore, fewer large-footprint cooling holes 266 can be used to achieve a comparable cooling effect as the prior art cooling holes 66, 166, which in turn reduces the flowrate of cooling air needed to cool the turbine blade 260. This reduces losses associated with removing cooling flow from the compressor 44, 52 and is good for turbine 46, 54 efficiency because it reduces aerodynamic mixing losses.

Referring to FIG. 6, in one example, the large-footprint cooling holes 266 are arranged in an array on the turbine blade 260. For instance, the array may be rows and columns. The large-footprint cooling holes 266 may be spaced further apart from one another on the turbine blade 260 as compared to prior art cooling holes on the turbine blades 60, 160 yet achieve the same cooling effect. In one example, a ratio of a pitch P between the large-footprint cooling holes 266 in the array to the diameter D of the metering section 268 (FIG. 4) is between approximately 3 and 20.

In one example, the large-footprint cooling holes 266 are formed in the turbine blade 260 by a milling process such as high-speed electrical discharge machining (EDM). In an EDM process, an electrode 300 is provided and is subject to a voltage, as is shown schematically in FIG. 6. The electrode 300 is brought adjacent the turbine blade 260 and results in the removal of material in the area of the electrode 300. In one example EDM process, the electrode 300 is guided along the turbine blade 260 to form the large-footprint cooling hole 266. In another example, the electrode 300 is provided in the shape of the large-footprint cooling hole 266 and is applied to the turbine blade 260 to remove material and provide the large-footprint cooling hole 266.

The large-footprint cooling holes 266 maybe also be formed by another process, such as laser hole drilling or waterjet drilling.

While the disclosed relates to turbine blades, other components having airfoils and in particular static turbine vanes, in particular, can benefit from this disclosure.

Although an embodiment of this invention has been disclosed, a worker of ordinary skill in this art would recognize that certain modifications would come within the scope of this disclosure. For that reason, the following claims should be studied to determine the true scope and content of this disclosure.

What is claimed is:

1. A cooling hole for a component, comprising:
   a meter section; and
   a diffuser section, the diffuser section having a footprint region defined by five sides, a first side of the five sides being a longest side, and second and third sides of the five sides meeting in an obtuse angle opposite the first side, wherein fourth and fifth sides of the five sides directly connect the first side to the second side and the first side to the third side, respectively, and the fourth side having a length, and being substantially parallel to the fifth side along a majority of the length of the fourth side.

2. The cooling hole of claim 1, wherein a ratio of a width of the footprint region to a diameter of the meter section is between approximately 2 and 10.

3. The cooling hole of claim 2, where a ratio of a height of the diffuser section to the diameter of the meter section is between approximately 4 and 15.

4. The cooling hole of claim 2, wherein a ratio of a width of the footprint region to a diameter of the meter section is between approximately 2 and 10.

5. The cooling hole of claim 2, where a ratio of a height of the diffuser section to the diameter of the meter section is between approximately 4 and 15.

6. The cooling hole of claim 1, wherein the obtuse angle opens towards the interior of the diffuser section.

7. The cooling hole of claim 1, wherein a geometry of the footprint region is defined by five axes each corresponding to one of the five sides.

8. The cooling hole of claim 1, wherein cooling air flows across the footprint region.

9. The cooling hole of claim 1, wherein the obtuse angle opens towards the interior of the diffuser section.

10. The cooling hole of claim 1, wherein a geometry of the footprint region is defined by at least five axes each corresponding to one of the at least five sides.

11. The cooling hole of claim 1, wherein cooling air flows across the footprint region.

12. A turbine component comprising:
    a component surface; and
    a diffuser section, the diffuser section having a footprint region defined by five sides, a first side of the five sides being a longest side, and second and third sides of the five sides meeting in an obtuse angle opposite the first side, wherein fourth and fifth sides of the five sides directly connect the first side to the second side and the first side to the third side, respectively, and the fourth side having a length, and being substantially parallel to the fifth side along a majority of the length of the fourth side.

13. The turbine component of claim 12, wherein the turbine component is an airfoil.

14. The turbine component of claim 12, wherein the diffuser section is a diffuser section of a cooling hole, and the cooling hole is arranged along a cooling hole axis, and the cooling hole axis is oriented between 40° 80° from a longitudinal axis of a turbine in a radial direction.

15. The turbine component of claim 12, wherein cooling air flows across the footprint region.

16. The turbine component of claim 15, wherein a ratio of a width of the footprint region to a diameter of a meter section is between approximately 2 and 10.

17. The turbine component of claim 16, wherein the diffuser section is a diffuser section of a first cooling hole of a plurality of cooling holes, and the plurality of cooling holes are arranged in an array along the component surface.

18. The turbine component of claim 17, wherein the plurality of cooling holes are arranged with a pitch between one another, and a ratio of a distance to a width of the footprint region is between approximately 5 and 20.

19. A cooling hole for a component, comprising:
    a meter section; and
    a diffuser section, the diffuser section having a footprint region defined by at least five sides, a first side of the at least five sides being a longest side, and second and third sides of the at least five sides meeting in an obtuse angle opposite the first side, wherein fourth and fifth sides of the five sides directly connect the first side to the second side and the first side to the third side, respectively, and the fourth side having a length, and being substantially parallel to the fifth side along a majority of the length of the fourth side.

20. A method for forming a cooled component, comprising:
    providing a component; and
    forming in the component a plurality of cooling holes, each of the plurality of cooling holes comprising a meter section and a diffuser section, the diffuser section having a footprint region defined by five sides, a first side of the five sides being a longest side, and second and third sides of the five sides meeting in an obtuse angle opposite the first side, wherein fourth and fifth sides of the five sides directly connect the first side to the second side and the first side to the third side, respectively, and the fourth side having a length, and being substantially parallel to the fifth side along a majority of the length of the fourth side.

21. The method of claim 20, wherein the forming step is accomplished by a milling process.

22. The method of claim 20, wherein the milling process is high-speed electrical discharge machining (EDM).

23. The method of claim 22 wherein the high-speed electrical discharge machining (EDM) includes bringing an electrode adjacent the component to remove material.

24. The method of claim 20, wherein the forming is accomplished by a cutting process.

25. The method of claim 24, wherein the cutting process is laser hole drilling.

26. The method of claim 24, wherein the cutting process is waterjet drilling.

* * * * *